United States Patent [19]
Toyosawa

[11] Patent Number: 4,952,765
[45] Date of Patent: Aug. 28, 1990

[54] COOKER FOR USE IN MICROWAVE OVEN
[75] Inventor: Manabu Toyosawa, Tokyo, Japan
[73] Assignee: Daiya Sangyo Co. Ltd., Tokyo, Japan
[21] Appl. No.: 376,023
[22] Filed: Jul. 6, 1989
[30] Foreign Application Priority Data Jul. 19, 1988 [JP] Japan .................................. 63-95507
Jul. 19, 1988 [JP] Japan .................................. 63-95508

[51] Int. Cl.⁵ .............................................. H05B 6/80
[52] U.S. Cl. ....................... 219/10.55 E; 99/DIG. 14;
99/410; 126/369; 126/386
[58] Field of Search ................ 219/10.55 E, 10.55 F,
219/10.55 R, 431, 440, 401; 99/403, 410, 413,
417, 451, DIG. 14; 126/348, 369, 369.2, 381,
382, 383, 384, 385, 386

[56] References Cited
U.S. PATENT DOCUMENTS

| 1,341,731 | 6/1920 | Berger | 126/384 |
| 1,468,908 | 9/1923 | Krafft | 126/384 |
| 4,271,344 | 6/1981 | Horiuchi et al. | 219/10.55 E |
| 4,478,349 | 10/1984 | Haverland, Jr. et al. | 219/10.55 E |
| 4,663,506 | 5/1987 | Bowen et al. | 219/10.55 E |
| 4,853,509 | 8/1989 | Murakami | 219/10.55 E |

Primary Examiner—Philip H. Leung
Attorney, Agent, or Firm—Edmund M. Jaskiewicz

[57] ABSTRACT

A cooker adapted for use in a microwave oven and comprising: a vessel for holding a material to be cooked and water; an outside lid for covering the vessel; and an inside cover disposed between the vessel and the outside lid and capable of storing components boiled over from the contents in the vessel during a boiling stage thereof, and capable of returning the boiled-over components to the vessel after the boiling stage. In this cooker, the inside cover is provided with a hole for returning the boiled-over components to the vessel and is supported so as to be able to move in a vertical direction, a vapor path is formed by the inside cover, the vessel and the outside lid in a peripheral portion of the inside cover when the inside cover is raised by an inner pressure of the vessel, and a closing member is provided in the outside lid, which member is capable of closing the hole for returning the boiled-over components when the inside cover is raised by the inner pressure of the vessel. The vessel also can be provided with a double wall construction.

2 Claims, 5 Drawing Sheets

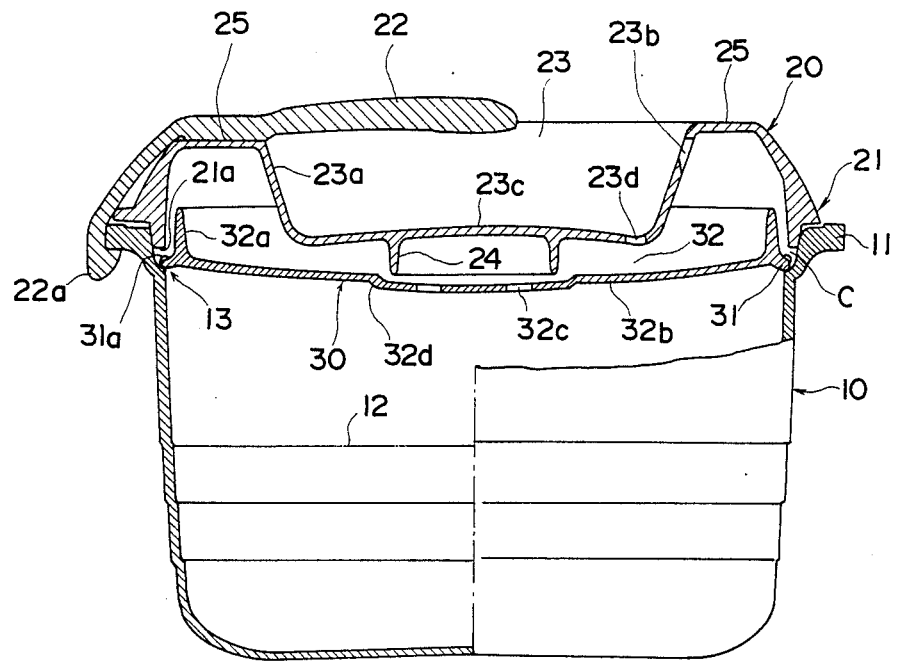
F I G. 1

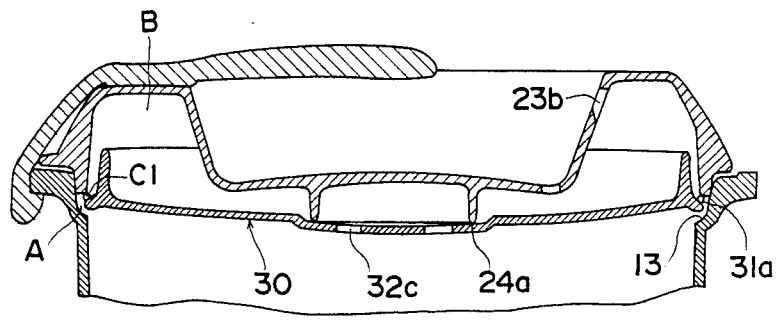
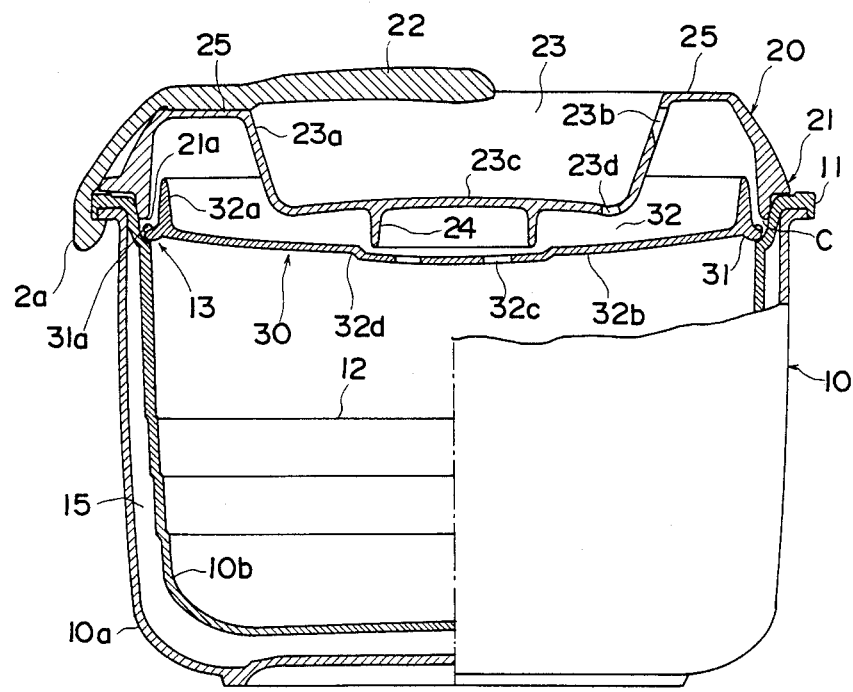

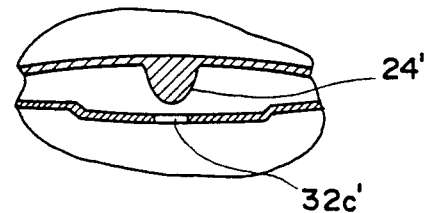
F I G. 5

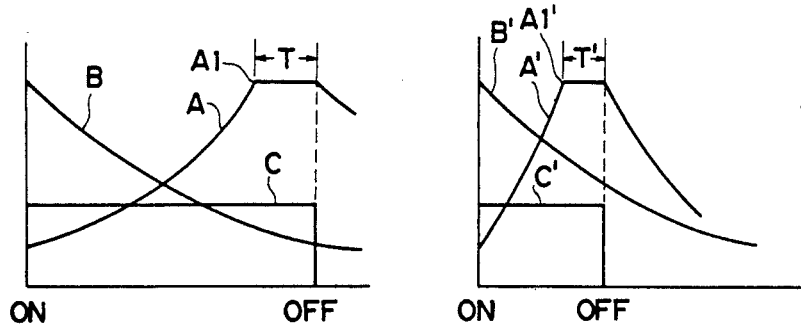
FIG. 7 PRIOR ART
FIG. 8
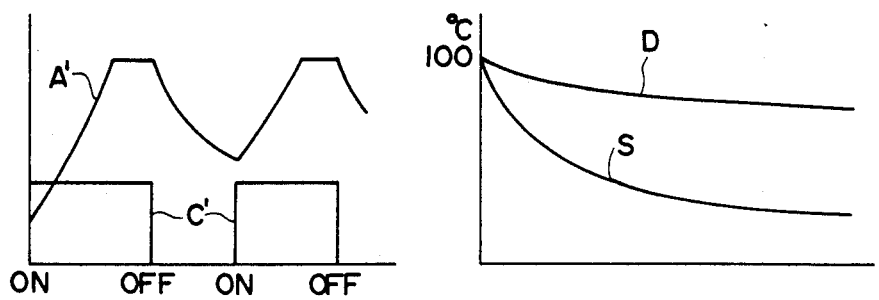
FIG. 9 PRIOR ART
FIG. 10
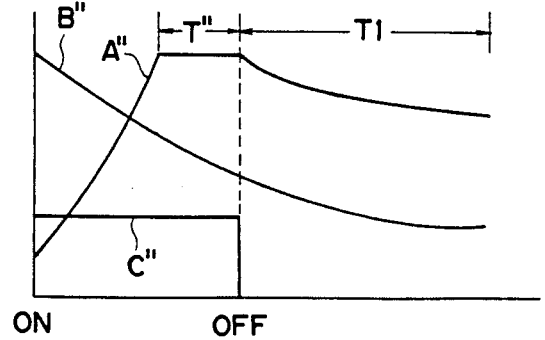
FIG. 11

COOKER FOR USE IN MICROWAVE OVEN

BACKGROUND OF THE INVENTION

1. Field of the Invention

The present invention relates to a cooker, particularly a rice cooker, for use in a microwave (or electronic) oven.

2. Description of the Related Art

FIG. 7 illustrates the relationship between a temperature of water, an amount of water and the ON/OFF state of a current source, when rice is boiled in a conventional electric rice cooker.

In the above FIG. 7, curve A shows the temperature of the water, curve B shows the amount of water remaining in a vessel (i.e., an amount of water corresponding to a remainder obtained by subtracting an amount of water absorbed by the rice from a total amount of water filled in the vessel), and curve C shows the ON/OFF state of the current source of the rice cooker.

As shown in FIG. 7, when a switch of the rice cooker is turned ON, the temperature of the water is gradually raised, the water gradually absorbed by rice, and the water comes to the boil at a point A1. This boiling condition is maintained for a predetermined period of time T (hereinafter the period T is referred to as the boiling stage), then the switch is turned OFF, and the temperature inside the vessel is gradually lowered. Boiled rice is obtained after a post boiling stage (heating stage with heat inertia) and a ripening stage (not shown).

As described above, the conventional rice cooker can produce good boiled rice, because the temperature of the water in the cooker is gradually raised, and thus the necessary amount of water can be absorbed by the rice.

FIG. 6 is a schematical sectional view of a conventional rice cooker for use in a microwave oven.

As shown in FIG. 6, the rice cooker comprises a vessel 1 for holding rice and water, an outside lid 2 for covering the vessel 1, and an inside cover 3 disposed between the vessel 1 and the outside lid 2.

The inside cover 3 is inclined downward to a center portion thereof provided with a hole 3a for returning boiled over components. The hole 3a is provided with escape valve 4, and a silicone rubber packing 5 is disposed to a peripherally around a portion of a bottom of the inside cover 3.

When such a conventional rice cooker is used in the microwave oven, the boiled rice is produced as follows:

(1) Rice and water are introduced into the vessel 1, and then the inside cover 3 and the outside lid 2 are fitted to the vessel 1.

(2) The rice cooker is placed in the microwave oven and heated therein.

FIG. 8 shows the relationship between a temperature of the water, an amount of water, and the ON/OFF state of a switch of the microwave oven. In FIG. 8, curve A' shows the temperature of water in the vessel, curve B' shows an amount of water remaining in the vessel (i.e., an amount of water corresponding to a remainder obtained by subtracting an amount of water absorbed by the rice from the total amount of water filled in the vessel), and curve C' shows the ON/OFF state of the switch of the microwave oven.

As shown in FIG. 8, when the switch of the oven is turned ON, the temperature of the water is raised more rapidly in comparison with the conventional electric rice cooker, but the water is only gradually absorbed by the rice. The water comes to the boil at a point A1'.

Under this condition (i.e., during the boiling stage T'), a pressure within the vessel 1 becomes higher than the atmosphere, and because the vessel 1 is sealed with the packing 5 around the peripheral portion of the inside cover 3, the escape valve 4 is opened and the return hole 3a in the inside cover 3 is blocked by a lower flange 4a. Accordingly, vapor is further, a boiling opaque liquid in the form of a foam is formed out through the aperture 4b. This boiling opaque liquid remains on the inside cover 3, because the return hole 3a is blocked with the lower flange 4a of the escape valve 4.

If the heating is continued at this stage, the contents may boil over from the cooker, and further, the moisture necessary to obtain a properly boiled rice may be lost. Therefore, the microwave oven must be turned OFF.

(3) When the heating is stopped, the pressure in the vessel 1 is reduced, the escape valve 4 is lowered to unblock the return hole 3a in the inside cover 3, and the opaque liquid on the inside cover 3 is returned to the vessel 1.

(4) After the condition (3) above is maintained for a predetermined time (e.g., 10 minutes), the microwave oven is again turned ON to resume heating.

Subsequently, the microwave oven is turned OFF and the boiled rice is obtained after ripening for a sufficient time.

FIG. 9 generally shows a relationship between the temperature of the water and the ON/OFF state of the source switch of the microwave oven, during the above procedures (2) to (4). In FIG. 9, curve A' shows the temperature of the water, and curve C' shows the ON/OFF state of the switch of the microwave oven.

The above mentioned conventional rice cooker for use in the microwave oven has disadvantages such that the packing 5 for sealing the vessel 1 and the peripheral portion of the inside cover 3, and the escape valve 4, must be provided.

Other disadvantages are that the escape valve 4 and the packing 5 must be washed after each cooking, and the cost of producing the cooker is increased because the number of the components thereof is increased.

The conventional rice cooker for use in the microwave oven has further disadvantages, as follows:

(1) Because the heating is carried out by the microwave oven, the temperature A' of water in the vessel 1 is rapidly increased to the boiling point, as shown in FIG. 8, and if the boiling stage is maintained, the moisture necessary to obtain properly boiled rice is lost in the form of vapor or together with the boiled over components. Therefore, the microwave oven must be turned OFF shortly after the contents reach boiling point.

(2) The rate at which the water is absorbed by the rice is increased as the temperature of water is increased, but because the vessel of the conventional rice cooker is composed of a single wall, the temperature in the vessel is rapidly lowered when the microwave oven is turned OFF after the contents reach the boiling point, and as a result, it is difficult to ensure that the rice has absorbed a sufficient amount of water.

Further, the post boiling and ripening treatments cannot be satisfactorily conducted because the temperature in the vessel is rapidly lowered.

Although the opaque liquid collected on the inside cover 3 is returned to the vessel 1 when the microwave oven is turned OFF, the liquid cannot be sufficiently absorbed by the rice, because of the rapid lowering of the temperature in the vessel.

Under the above circumstances, the heating in the conventional rice cooker must be resumed when it is used in the microwave oven as shown in FIG. 9. Namely, as described above, the conventional rice cooker for use in a microwave oven cannot produce good boiled rice unless the microwave oven is operated twice.

SUMMARY OF THE INVENTION

Accordingly, the object of the present invention is to provide a cooker which does not require the conventionally necessary packing and escape valve, to eliminate the above first mentioned disadvantages.

Another object of the present invention is to provide a cooker which can produce good boiled rice by only one operation of the microwave oven, to eliminate the above second-mentioned disadvantages.

Other objects and advantages of the present invention will be apparent from the following description.

In accordance with a first aspect of the present invention, there is provided a cooker adapted for use in a microwave oven, comprising: a vessel for holding a material to be cooked (for example, a grain such as rice, or vegetables such as beans, peas and potatoes), and water; an outside lid for covering the vessel; and an inside cover disposed between the vessel and the outside lid, capable of storing components boiled over from the contents in the vessel during a boiling stage thereof, and further capable of returning the boiled-over components to the vessel after the boiling stage; the inside cover being provided with a hole for returning the boiled-over components to the vessel, and being movably supported therein in a vertical direction; a vapor path being formed by the inside cover, the vessel and the outside lid in a peripheral portion of the inside cover when the inside cover is raised by an inner pressure of the vessel, and a closing member being provided in an outside lid, which member is capable of closing the hole for returning the boiled-over components when the inside cover is raised by the inner pressure of the vessel.

In accordance with a second aspect of the present invention, there is provided a cooker adapted for use in a microwave oven, comprising: a vessel for holding a material to be cooked, and water; an outside lid for covering the vessel; and an inside cover disposed between the vessel and the outside lid, capable of storing components boiled over from the contents in the vessel during a boiling stage thereof, and further capable of returning the boiled-over components to the vessel after the boiling stage; the above vessel being provided with a double wall construction.

BRIEF EXPLANATION OF THE DRAWINGS

FIG. 1 is a partially broken-away sectional front view of a first embodiment of the cooker according to the present invention for use in the microwave oven, and corresponds to a sectional view taken along the line A—A of FIG. 2;

FIG. 3 is a sectional view illustrating a function of the cooker;

FIG. 4 is a partially broken-away sectional front view of a second embodiment of the cooker for use in the microwave oven, according to the present invention, and corresponds to a sectional view taken along the line A—A of FIG. 2;

FIG. 5 is a fragmentary sectional view illustrating another embodiment of the hole in the inside cover for returning the boiled-over components, and the closing member in the outside lid for blocking the return hole;

FIG. 7 generally illustrates the relationship between the temperature of the water, the amount of water, and the ON/OFF state of an electric source, when the rice is boiled in the conventional electric rice cooker;

FIG. 8 generally illustrates the relationship between the temperature of the water, the amount of water, and the ON/OFF state of an electric source, when the rice cooker for use in the microwave oven is placed therein and heated;

FIG. 9 generally illustrates the relationship between the temperature of the water and the ON/OFF state of the electric source switch of the microwave oven, where the rice is boiled in the conventional cooker for use in the microwave oven;

FIG. 10 generally illustrates the differences in the ways in which the temperature is lowered when the vessel has a single wall or a double wall; and, FIG. 11 generally illustrates the way in which the temperature of the vessel is lowered, in the second embodiment of the cooker according to the present invention.

DESCRIPTION OF THE PREFERRED EMBODIMENTS

Figure 2:
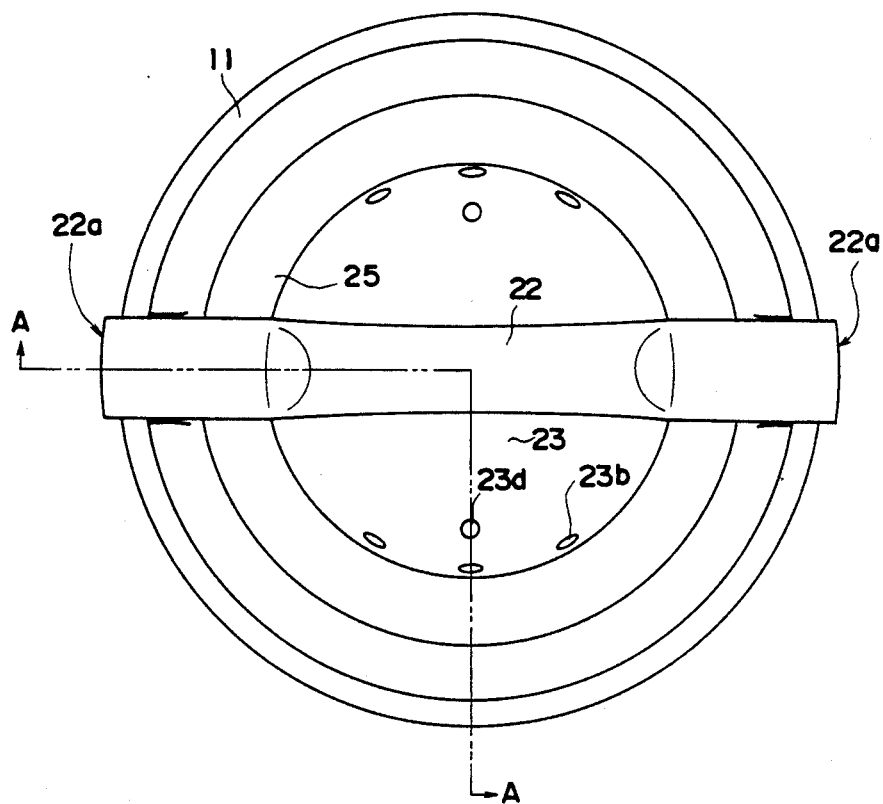
FIG. 2 is a plan view of FIG. 1.
Figure 6:
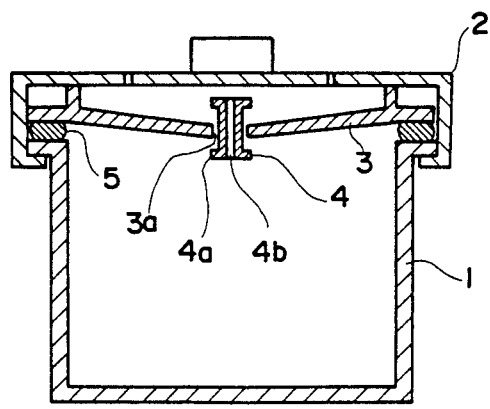
FIG. 6 is a sectional view of the conventional cooker for use in the microwave oven.

The cooker according to the first aspect of the present invention will be described hereinafter.

First, rice and water are introduced into the vessel and then the inside cover and the outside lid are fitted thereto. The rice cooker is then placed in the microwave oven and heated, and thus the pressure in the vessel becomes higher than the atmosphere, whereby, because the inside cover is supported in such a manner that it can move in a vertical direction, the inside cover is raised.

When the inside cover is raised, the return hole in the inside cover is blocked by the closing member mounted on the outside lid but, at the same time, a vapor path is formed by the inside cover, the outside lid, and the vessel in the peripheral portion of the inside cover, and as a result, vapor is blown out through the vapor path around the peripheral portion of the inside cover, and the opaque liquid is also boiled over therethrough in the form of foam. The opaque liquid remains on the inside cover, because the return hole in the inside cover is blocked by the closing member on the outside lid.

When the heating is stopped by turning OFF the microwave oven, the pressure in the vessel is lowered, and thus the inside cover is lowered. Accordingly, the return hole in the inside cover is opened and the opaque liquid collected on the inside cover is allowed to return to the vessel.

As described above, according to the first embodiment of the present invention, the inside cover per se can be moved upward and downward to function as a valve, and therefore, the conventional packing and the escape valve necessary in the conventional cooker are not required.

The cooker according to a second aspect of the present invention will be described hereinafter.

In this embodiment the cooker vessel is provided with a double wall construction, and therefore when the microwave oven is turned OFF after the contents in the vessel come to the boil, the temperature in the vessel can be maintained for a remarkable longtime in comparison with the conventional cooker vessel having a single wall construction. The temperature in the vessel of the cooker of the present invention is gradually lowered, and FIG. 10 generally shows the ways in which the temperature is lowered in the vessels having either a single wall or a double wall construction. In FIG. 10, curve S shows the temperature change in the case of the vessel having a single wall construction, and curve D shows the temperature change in the case of the vessel having a double wall construction.

As described above, the temperature is satisfactorily maintained even if the microwave oven is turned OFF after the contents in the vessel come to the boil. Therefore, the rice can absorb a sufficient amount of water, and the post-boiling stage and the ripening stage can be satisfactorily conducted.

Further, the rice can also absorb a sufficient amount of the opaque liquid returned to the vessel from the inside cover.

Therefore, when the rice cooker according to the second aspect of the present invention is used, good boiled rice can be obtained by only one procedure, instead of the two procedures necessary when employing the conventional rice cooker for use in the microwave oven.

The present invention will be explained in more detail with reference to the drawings.

FIG. 1 is a partially broken-away sectional front view of the first embodiment of the cooker according to the present invention for use in the microwave oven, and corresponds to a sectional view taken along the line A—A of FIG. 2. FIG. 2 is a plan view of FIG. 1.

In FIGS. 1 and 2, the cooker comprises a vessel 10 for holding rice and water, an outside lid 20 for covering the vessel 10, and an inside cover 30 disposed between the vessel 10 and the outside lid 20. The vessel 10, the outside lid 20, and the inside cover 30 are made of a heat-resistant resin allowing a good penetrability by microwaves.

The vessel 10 is provided with a flange 11 and three circular steps 12, which may be used as measures for the amount of water to be filled in the vessel.

The outside lid 20 is fitted with a joining member 21 for fixing the outside lid 20 to the vessel 10, a handgrip 22, a reservoir 23 for holding the opaque liquid (as mentioned below), and a closing member 24 (disposed at the bottom of the reservoir 23) for blocking a return opening.

The joining member 21 is inserted to, and in close contact with the upper portion of, the vessel 10.

The handgrip 22 is fixed to the upper surface 25 of the outside lid 20 by heat fusion or the like, and is provided at both ends thereof with hook members 22a, 22a which can be detachably fixed to the flange 11 of the vessel.

The reservoir 23 is provided with six vapor holes 23b in the upper portion of the sloping side wall 23a, and two holes 23d (for returning the opaque liquid) in the bottom 23c. The bottom 23c is gradually inclined toward the return holes 23d.

The member 24 for closing the return holes 32c (as aftermentioned) has a ring-like shape and is integrally formed with the bottom 23c of the reservoir 23.

The inside cover 30 comprises a flange 31 to be mounted on a supporting tier 13 formed on the inside wall of the vessel 10, and a reservoir 32 for holding the opaque liquid. The surface of the flange 31 is provided with protrusions 31a formed on the peripheral portion thereof at intervals. The reservoir 32 comprises a ring-shaped side wall 32a and a bottom 32b. The bottom 32b is provided with at the center portion thereof two holes 32c for returning the liquid, and is inclined gradually toward the hole 32c with the center portion thereof forming a depressed portion having a step 32d.

When employing the above-mentioned rice cooker for use in the microwave oven, the boiled rice is produced as follows:

(1) Rice and water are introduced into the vessel 10. The amount of water may be adjusted by using the steps (measures) 12.

(2) The inside cover 30 is mounted on the supporting step 13 of the vessel and is covered with the outside lid 20. The outside lid 20 is fixed to the flange 11 of the vessel by the hooks 22a. The joining member 21 is inserted into the vessel 10 in such a manner that the member 21 is brought into close contact with the upper portion of the vessel 10 but gaps C are formed between the lower portion 21a of the joining member 21 and the top portions of the protrusions 31a on the flange of the inside cover 30.

(3) The rice cooker is placed in the microwave oven and heated therein.

The temperature of water in the vessel 10 is raised more rapidly to the boiling point, in comparison with the conventional electric rice cooker (see FIG. 8).

When the pressure in the vessel 10 becomes higher than atmosphere, the inside cover 30 is raised to form the gap C, due to the gaps C between the lower portion 21a of the joining member 21 and the top portions of the protrusions 31a on the flange of the inside cover 30 (see FIG. 3).

As shown in FIG. 3, when the inside cover 30 is raised, the lower surface 24a of the closing member 24 formed on the outside lid 20 is brought into contact with the upper surface of the inside cover 30, whereby the return hole 32c of the inside cover 30 is blocked. At the same time, small gaps C1 are formed between the upper surface of the flange of the inside cover 30 and the lower surface 21a of the joining member 21 of the outside lid 20, because of the protrusions 31a on the flange of the inside cover. As a result, vapor paths A are formed at the peripheral portion of the inside cover 30 by the inside cover 30, the vessel 10, and the outside lid 20.

The vapor is blown out through the vapor paths A into a chamber B formed between the outside lid 20 and the inside cover 30. Further, the opaque liquid is boiled over in the form of foam together with the vapor. Because the gaps C1 between the upper surface of the flange of the inside cover 30 and the lower surface 21a of the joining member 21 of the outside lid 20 are very small, the foam of the opaque liquid is finely divided, and thus cannot be discharged out of the cooker. The pressure in the chamber B is lower than that in the vessel 10, but higher than atmosphere (the pressure outside the cooker), and thus the chamber B serves as a buffer room for the vapor ejected from the vessel 10 through the vapor paths A and vapor holes 23b.

The boiled over opaque liquid remains on the reservoir 32 on the inside cover 30, because the return holes 32c of the inside cover 30 are blocked by the closing member 24 on the outside lid 20, as described above. When a certain amount of the opaque liquid is collected in the reservoir 32, the contact between the lower surface 24a of the closing member 24 and the upper surface of the inside cover 30 becomes tighter, due to a sealing effect of the opaque liquid, and thus the return hole 32c are more thoroughly blocked.

(4) If the heating is continued under the above condition (3), the moisture necessary to obtain properly boiled rice is lost in the form of vapor, and thus the microwave oven must be turned OFF.

When the heating is stopped, the pressure in the vessel 10 is lowered, and thus the inside cover 30 is lowered. Therefore, the return holes 32c blocked by the closing member 24 on the outside lid 20 are opened, and the opaque liquid collected on the inside cover 30 is returned to the vessel 10.

The cooker is maintained under the above condition for a given time, and then the microwave oven is again turned ON.

(5) Subsequently, the microwave oven is turned OFF, and the rice is ripened for a predetermined period of time to yield the desired boiled rice.

The second embodiment of the present invention will be described hereinafter.

FIG. 4 is a partially broken away sectional front view of the second embodiment of the cooker according to the present invention for use in the microwave oven.

The rice cooker of the second embodiment is same as that of the first embodiment, except that the vessel 10 of the cooker of the second embodiment has a double wall structure, i.e., an outside wall and an inside wall.

The vessel 10 of the cooker according to the second embodiment comprises an outside vessel 10a and an inside vessel 10b. The outside vessel 10a is closely fixed to the inside vessel 10b at the flange 11 by heat fusion or the like, and therefore a sealed space 15 is formed between the outside vessel 10a and the inside vessel 10b. Thus the sealed space is provided to maintain the temperature in the vessel. Further, the inside vessel 10b is provided with three steps 12 which can be used as a measure for the amount of water to be filled in the vessel 10.

The desired boiled rice is obtained by using the rice cooker of the second embodiment in much the same way as in the rice cooker of the first embodiment, and therefore, only those procedures for the cooker of the second embodiment different to those of the cooker of the first embodiment will be explained in detail hereinafter.

(1) Rice and water are introduced into the vessel 10.

(2) The inside cover 30 is mounted on the supporting step 13 of the vessel 10, and the vessel 10 is covered with the outside lid 20. Gaps C are formed between the lower portion 21a of the joining member 21 and the top portions of the protrusions 31a on the flange of the inside cover.

(3) The rice cooker is placed in the microwave oven and heated therein. The temperature of water in the vessel 10 is rapidly increased to boiling point (see FIG. 8), and when the pressure in the inside vessel 10b of the vessel 10 becomes higher than atmosphere, the inside cover 30 is raised by the gap C (see FIG. 3).

When the inside cover 30 is raised, the return hole 32c of the inside cover 30 is blocked by the closing member 24 formed on the outside lid 20, and at the same time, vapor paths A are formed and vapor is blown out through the vapor paths A into the chamber B, and the opaque liquid is boiled over in the form of foam together therewith. The boiled over opaque liquid is held in the reservoir 32 on the inside cover 30.

(4) After the heating is continued under the above conditions of item (3) for a predetermined time T" (see FIG. 11), the microwave oven is turned OFF.

In the second embodiment of the present invention, the heating time T" can be longer than the heating time T' in the conventional rice cooker for use in the microwave oven (see FIG. 8). For example, the heating time T' must be relatively short in the conventional cooker, whereas the heating time T" may be, for example, 3 to 5 minutes. This is because the opaque liquid boiled over through the vapor paths A is finely divided and is not discharged from the cooker. This extension of the heating time T" accelerates the speed at which the rice absorbs the water.

(5) When the heating is stopped, the pressure in the vessel 10 is reduced, and the inside cover 30 is lowered. Accordingly, the return hole 32c (in the inside cover) blocked by the closing member 24 on the outside lid 20 is opened, and the opaque liquid held in the reservoir 32 on the inside cover 30 is returned to the vessel 10.

According to the second embodiment of the present invention, because the cooker of the present invention has a vessel having a double wall construction, the temperature in the vessel 10 can be better maintained and is more gradually lowered, in comparison with the conventional cooker with the vessel having the single wall construction. FIG. 11 generally shows the way in which the temperature in the vessel of the rice cooker according to the second embodiment of the present invention is lowered. In FIG. 11, curve A" shows the temperature of the water in the vessel, curve B" shows an amount of water remaining in the vessel (i.e., the amount of water corresponding to a remainder obtained by subtracting an amount of water absorbed by the rice from the total amount of water filled in the vessel), and curve C" shows the ON/OFF state of the switch of the microwave oven.

As shown in FIG. 11, when the switch of the oven is turned OFF, the temperature in the vessel 10 can be maintained, and therefore, the rice can absorb a sufficient amount of water, and thus the post boiling and ripening stages can be satisfactorily performed. Further, the opaque liquid held in the reservoir 32 on the inside cover 30 and returned to the vessel can be satisfactorily absorbed by rice.

(6) The desired boiled rice is produced after the post-boiling and ripening stages.

As explained above, by employing the rice cooker according to the second embodiment of the present invention for use in the microwave oven, good boiled rice can be obtained by only one procedure, not the two procedures necessary in the conventional rice cooker for use in the microwave oven.

Further, the return hole 32c in the inside cover 30 and the closing member 24 on the outside lid 20 can have any shape other than those shown in the above embodiments. For example, FIG. 5 illustrates a single hole 32c' for returning the opaque liquid, and a protrusion 24' to be inserted in the hole 32c' as the closing member.

Furthermore, the cooker of the second embodiment may include any types of inside cover and outside cover other than those shown in the above embodiments.

Although the present invention has been described with reference to specific embodiments, various changes and modifications obvious to those skilled in the art are deemed to be within the spirit, scope and concept of the invention.

I claim:

1. A cooker adapted for use in a microwave oven, comprising: a vessel for holding a material to be cooked and water; an outside lid for covering the vessel; and an inside cover disposed between the vessel and the outside lid and capable of storing components boiled over from the contents in the vessel during a boiling stage thereof, and capable of returning the boiled-over components to the vessel after the boiling stage; the inside cover being provided with a hole for returning the boiled-over components to the vessel and is supporting so as to be able to move in a vertical direction; a vapor path being formed by the inside cover, the vessel and the outside lid in a peripheral portion of the inside cover when the inside cover is raised by an inner pressure of the vessel, and a closing member being provided in the outside lid, which member is capable of closing said hole in said inside cover when the inside cover is raised by the inner pressure of the vessel.

2. A cooker according to claim 1, wherein the vessel has a double wall construction.

* * * * *